United States Patent
Rosin

[54] IMAGE SPACING SYSTEM

[72] Inventor: Seymour Rosin, Massapequa, N.Y.

[73] Assignee: Harris-Intertype Corporation, Cleveland, Ohio

[22] Filed: May 4, 1970

[21] Appl. No.: 34,371

[52] U.S. Cl. .................................................. 95/4.5
[51] Int. Cl. ............................................. B41b 21/16
[58] Field of Search ..................................... 95/4.5

[56] References Cited

UNITED STATES PATENTS 3,364,830  1/1968  Aschenbrenner........355/52 X

*Primary Examiner*—John M. Horan
*Attorney*—Marechal, Biebel, French & Bugg

[11] 3,687,025
[45] Aug. 29, 1972

[57] ABSTRACT

An image projection system successively projects images along a common optical axis toward a photosensitive surface. The individual images are spaced side by side on the photosensitive surface. The spacing is accomplished by collimating the image bearing light beams, then diverting the collimated beam by means of a movable reflecting surface (or equivalent) into a refocusing and scan lens assembly from which the light beams emit onto the photosensitive surface. The position of the reflector is controlled by any suitable means such as a servo mechanism. The refocusing and scan lens assembly incorporates compensation for the angular position of the reflecting member with respect to the optical centerline, whereby the images remain in focus and are not distorted even though the photosensitive surface is maintained flat at the image plane of the system.

3 Claims, 3 Drawing Figures

INVENTOR
SEYMOUR ROSIN

BY
Mareschal, Biebel, French & Bugg
ATTORNEYS

IMAGE SPACING SYSTEM

CROSS-REFERENCE TO RELATED APPLICATION

This application is related to copending application Ser. No. 34,300, filed of even date herewith, entitled Optical character Spacing System for Phototypesetting and assigned to the same assignee as this application.

BACKGROUND OF THE INVENTION

Suggestions have been made in the prior art for spacing of images on a photosensitive surface through the use of rotatable reflecting members, such as a mirror, which is moved to different angular positions and therefore reflects the image bearing light beams to different regions of the photosensitive surface, for example in order to achieve character spacing in a photoprinter. U. S. Pat. No. 1,175,685, issued Mar. 14, 1916, discloses a typical such system, wherein the photosensitive surface is mounted in a flat image plane, and a movable optical system is incorporated in conjunction with the angularly moving mirror in order to maintain proper focus of the images. Other suggestions have been made using angularly movable or rotatable mirrors or reflectors, in which the film is mounted along an arc which has the center of rotation of the mirror as its focus. This has been found, however, to result in some distortion in the images, since they are being focused onto the photosensitive surface along a short arc, rather than over a flat plane. Furthermore, handling of photosensitive materials, particularly film, is somewhat difficult and when the film in particular is curved transversely to its length, it is difficult to maintain it accurately across the desired arc, hence this arrangement has considerable practical drawbacks.

SUMMARY OF THE INVENTION

In accordance with the present invention, successive collimated image bearing light beams are produced by equipment which is known per se. The size of the images may be controlled by known means if desired. The collimating lens system collimates the images bearing beam into parallel rays, and the collimated beam is directed to a rotating reflector such as a mirror or a refracting equivalent. The angular position of the reflector is suitably controlled, as by a servo motor system which holds the mirror in selected different angular positions with the necessary accuracy. The servo motor may be controlled in accordance with image width information derived at the time of selection of the character, by apparatus which is per se known. The collimated beams are thus directed to different locations, and a scan and refocusing lens assembly receives these beams, at the different angular locations, from the rotatable reflector, and directs the beams onto the photosensitive surface. This surface, such as photographic film or paper, is mounted in an image plane and the scan lens assembly focuses the image bearing beams in this plane, to form properly sized images in the proper succession.

With regard to this point, a desirable arrangement, and probably the most practical one, dictates that any angular displacement of the mirror should have its counterpart in a linear displacement on the film plane. This should be true whether the angle is relatively large or relatively small, and this relationship should hold anywhere across the image plane.

In order to achieve this, the optical system should have properties different from those of normal, or so-called distortion free, lenses. For the latter (FIG. 2, hereinafter described) consider collimated light which, falling on lens L from the left will be converged to a point A at a distance $f$ from the lens. The relationship from the diagram can then be written as:

$$y' = f \tan \theta \qquad 1.$$

where $y'$ is the distance of A from the optical axis.

Relating this to an actual system, the point A is on the film and the latter is intersected by the optical axis XX in the center of the line. From equation 1 it is seen that the relationship between angular motion $\theta$ in the collimated space and interval $y'$ on the film, is nonlinear. Further, upon differentiating 1, we get $$dy' = f \sec^2 \theta \, d\theta \qquad 2$$

which gives the relationship for small displacements $dy'$ on the film to $d\theta$ for angle (character interval).

By changing 1 so tat it reads:

$$y' = f \cdot \theta \qquad 1'$$

and its differential then becomes $$dy' = f \cdot d\theta \qquad 2'$$

and both large and small displacements become linear and independent of position on the line.

The novel scan lens assembly thus is of a special construction which obeys the relationship of formula $1'$ instead of formula 1, and compensates for distortion of the image size at the extreme angular positions of the rotatable reflector to either side of a mid position in which beams reflected from it would intersect the photosensitive surface at right angles. The scan lens assembly then has designed into it compensation for changes in focus due to the increase in length of the optical path as the light beams intersect the photosensitive surface at angles decreasing from 90°. Therefore, the scan lens assembly operates as a passive element which provides the necessary compensation for distortion and/or change in focus due to deviation of the light beam from direct right angle intersection with the image plane. The result is the creation of side by side images, which are in focus across the entire width of the column, and images which are sharp and not distorted.

Proper spacing and undistorted images are the most significant things about the special scanning lens design. A camera lens could serve the purpose of focusing the image on a flat plane, because the light entering the lens is collimated. The displacement of the image along the base line would not be directly proportional to the angle of rotation of the mirror, however, but it would be directly proportional to the tangent of the angle. The width of the image itself would also be proportional to the tangent of the angle of rotation.

The spacing distortion might be, with difficulty, compensated by rotating the mirror in step sizes modified by the tangent function. The angle of rotation for an image of a given size would be different at the end of the line than at the center. But, this still would not compensate for the distortion of the width of the image. The special scan lens also accomplishes that correction, and the entire dual function is achieved in a passive element.

The primary object of the invention, therefore, is to provide a novel image spacing apparatus wherein lightweight low-inertia moving parts are employed with novel passive or non-moving elements for purposes of spacing the images in desired side by side relation; and to provide a novel lens which compensates for image distortion due to the entry angle of collimated image beams into the lens.

Other objects and advantages of the invention will be apparent from the following description, the accompanying drawings and the appended claims.

DESCRIPTION OF THE PREFERRED EMBODIMENT

Figure 1:
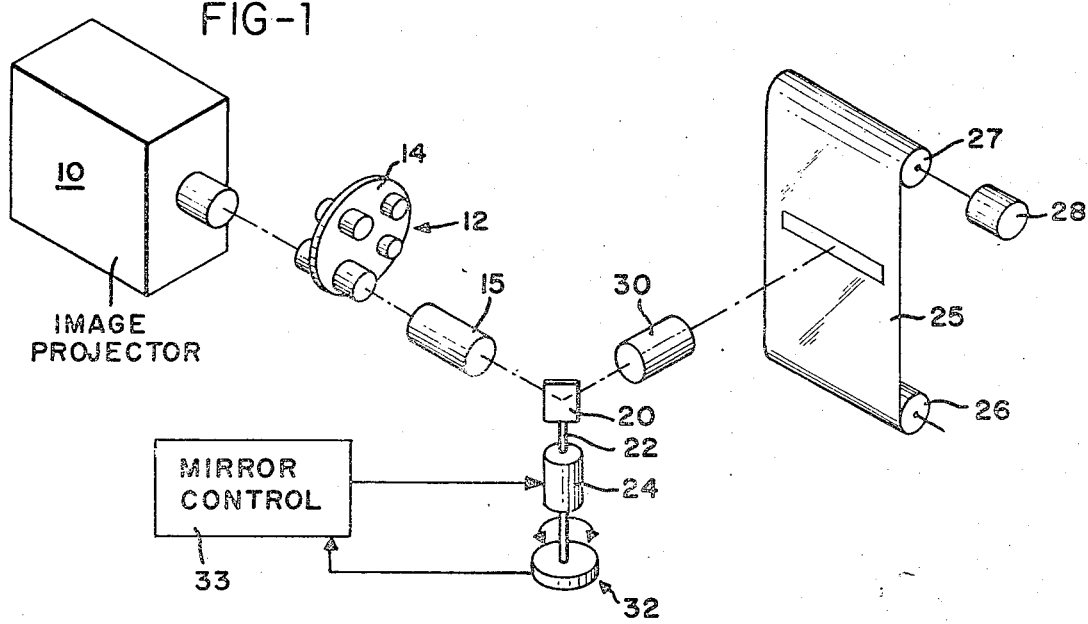
FIG. 1 is a schematic diagram showing the image projection system as provided by the invention, together with block diagram illustrations of the controls therefor.

Referring to the drawing, a character image projecting system 10 successively projects image bearing light beams through one of a plurality of sizing lenses 12 carried for example in a turret 14 such that any selected one of these lenses is movable into the optical path, thus changing the size of the resultant image. Alternatively, adjustable sizing lenses could be employed. The light beams then pass to a collimating lens system 15. This collimating lens preferably has some adjustment of its focal length, sufficient for initial set-up and precise focusing, but once this adjustment is made, ordinarily the collimating lens is not further adjusted.

The collimated light beams emitted from the collimating lens 15 are directed onto a rotatable reflector or mirror 20 which is connected to the shaft 22 of a servo motor 24 which functions as a means for selectively changing the angularity of the reflection of the collimated lens, in order to direct the collimated light beams to different portions of a photosensitive material or surface 25, which may be for example photographic film or paper from a supply roll 26, passing to a take-up roll 27 under the control of a motor 28 that functions as a spacing control for the vertical spacing of images. The reflector 20 directs light to the plane of the photosensitive material 25 in such a way that the center of a side by side arrangement of images to be formed on the material 25 is at a point at right angles to the beam of light coming from the reflector 20. Thus, the reflector displaces the beams to either side of this center line.

Between the reflector and the image plane defined by the position of the photosensitive material 25, there is a scan or refocusing lens 30 which functions to focus the collimated light beams and thus produce a real image at the image plane and on the photosensitive material. At the same time, this scan lens provides compensation for the angularity of light beams striking the photosensitive surface at some angle less than 90°, as when the light beams are displaced to either side of the center. Obviously, the farther the light beams are displaced in either direction, the more acute this angle will become, and in an ordinary optical system this would produce blurring of the images due to change in optical path, and would also produce a distortion of the image, with the image tending to become wider as it is displaced farther from the center line.

Figure 2:
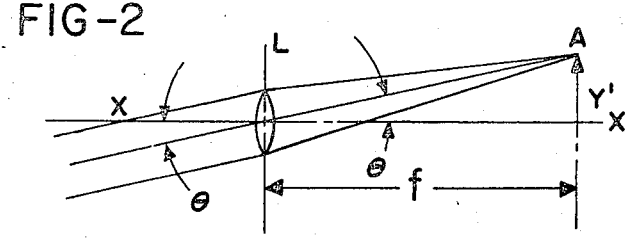
FIG. 2 is a diagram showing relationships in the optical system.

The scan lens 30 thus functions as a passive element which provides for proper focus and sizing and spacing of the images, while permitting the photosensitive material to be supported in a plane. This scan lens is of a special design, such that light being focused by it obeys the relationship $y' = f \cdot \theta$ rather than the more usual $y' = f \cdot \tan \theta$, as shown in FIG. 2.

The specification for a typical scan lens, which has been used successfully, are as follows:

| Surf. | Radius mm | C.A./2 mm | Thickness t(mm) | Index dispersion | Element |
|---|---|---|---|---|---|
| a. | STOP | 11.08 | 79.84 | | |
| b. | −111.870 | 30.84 | 5.94 | 1.707,542 | I |
| c. | −65.069 | 32.37 | 17.97 | | |
| d. | −54.903 | 34.00 | 4.77 | 1.625,422 | II |
| e. | −235.960 | 35.40 | 9.46 | 1.812,233 | III |
| f. | −454.590 | 38.04 | 3.96 | | |
| g. | −2677.500 | 39.77 | 11.83 | 1.707,542 | IV |
| h. | −94.147 | 42.88 | 382.73 | | |

Figure 3:
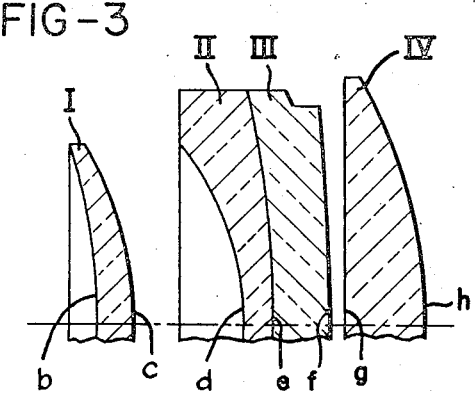
FIG. 3 is a detail drawing of one suitable form of scanning lens.

In this specification, C.A. is the clear aperture of the corresponding surface, Index is the index of refraction, and Element refers to the item in FIG. 3. Surface a is merely a mask opening (not shown) to the left of element I.

Thus, in this system the only member which moves for spacing of images across the photosensitive material is the relatively lightweight, low inertia, mirror or reflecting member 20. With the servo motor 24, it is possible to achieve the necessary angular movements and positioning of the mirror 20 at very high speeds, and with high accuracy. To this end, a position encoder 32 is driven from the servo motor 24, providing a position feedback control to the mirror control circuits 33.

If desired, properly selected size control lenses can function as the initial collimating lens, thereby eliminating one element of the system shown in FIG. 1, and directing collimated images from the appropriately chosen size control lens onto the reflector member 12. However, in any event the system provides, as an essential condition, a linear displacement of images across the image plane corresponding to the angular relation of the entering collimated beam and the optical center line of the scanning lens. This is achieved through use of a specially designed scanning lens as above described.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an image recording system,
   a photosensitive surface supported in an image plane,
   a collimating lens receiving successive image bearing light beams and directing them along a center-line to the photosensitive surface,
   selectively movable means for changing angularly the direction of the collimated beams, and a scan lens receiving the beams from said movable means, said scan lens being constructed and arranged to adjust the beams according to the relationship $y' = f \cdot \theta$, where $y'$ is the distance of the image from the intersection of the axis of the scan lens and the image plane, f is the effective focal length of the scan lens to the image plane, and $\theta$ is the angle between the collimated beams and the optical axis of the scan lens, and thereby to refocus the collimated beams onto the photosensitive surface and simultaneously to compensate for any variations in image dimension introduced by deviation of the refocused beam from the optical center-line.

2. A machine as defined in claim 1, wherein said movable means for changing the angular direction of the collimated beams is a reflecting member intersecting the beams emitting from said collimating lens and rotatable about an axis at right angles to such collimated beams.

3. The method of placing a plurality of images in side by side relation on a photosensitive member, comprising the steps of
   a. generating the images in succession and directing the image beams into a light collimating device,
   b. deflecting the collimated image beams to different predetermined locations on a photosensitive surface supported in an image plane whereby the collimated beams to tend to intersect the image plane at an angle,
   c. directing the deflected collimated beams first through a scan lens having corrective power related to the possible angular entry positions of the collimated beams into the scan lens in accordance with the relationship $y' = f \cdot \theta$, where $y'$ is the distance of the image from the axis of the scan lens and the image plane, f is the effective focal length of the scan lens, and $\theta$ is the angle between the collimated beams and the optical axis of the scan lens such that the images focused on the photosensitive surface are undistorted despite the angular impingement of the beams thereon.

* * * * *